US012099609B2

(12) United States Patent
Chu

(10) Patent No.: US 12,099,609 B2
(45) Date of Patent: Sep. 24, 2024

(54) COMBINATION BIOS WITH A/B RECOVERY

(71) Applicant: Advanced Micro Devices, Inc., Santa Clara, CA (US)

(72) Inventor: Hsiu-Ming Chu, Taipei (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 99 days.

(21) Appl. No.: 17/127,554

(22) Filed: Dec. 18, 2020

(65) Prior Publication Data

US 2022/0197746 A1    Jun. 23, 2022

(51) Int. Cl.
*G06F 21/57* (2013.01)
*G06F 8/65* (2018.01)
*G06F 9/44* (2018.01)
*G06F 9/4401* (2018.01)
*G06F 11/14* (2006.01)

(52) U.S. Cl.
CPC .............. *G06F 21/572* (2013.01); *G06F 8/65* (2013.01); *G06F 9/4403* (2013.01); *G06F 11/1417* (2013.01); *G06F 2201/805* (2013.01); *G06F 2221/033* (2013.01)

(58) Field of Classification Search
CPC ...... G06F 21/57; G06F 21/572; G06F 21/575; G06F 8/65; G06F 11/1417; G06F 11/1433; G06F 9/4401; G06F 9/4403; G06F 9/4405
See application file for complete search history.

(56) References Cited

U.S. PATENT DOCUMENTS

| 6,237,091 B1* | 5/2001 | Firooz | G06F 8/65 710/10 |
| 9,880,908 B2* | 1/2018 | Jeansonne | G06F 3/0619 |
| 11,409,607 B1* | 8/2022 | Hung | G06F 11/076 |
| 2003/0126511 A1* | 7/2003 | Yang | G06F 9/4401 714/39 |
| 2004/0054883 A1* | 3/2004 | Goodman | H04L 69/329 713/1 |
| 2008/0288767 A1* | 11/2008 | Wang | G06F 11/1417 713/2 |
| 2010/0100720 A1* | 4/2010 | Wu | G06F 11/1417 713/2 |
| 2012/0023322 A1* | 1/2012 | Landry | G06F 8/65 713/2 |
| 2012/0124567 A1* | 5/2012 | Landry | G06F 8/65 717/168 |
| 2012/0239920 A1* | 9/2012 | Yang | G06F 8/65 713/2 |

(Continued)

FOREIGN PATENT DOCUMENTS

WO    WO-2021087221 A1 *    5/2021

*Primary Examiner* — Jaweed A Abbaszadeh
*Assistant Examiner* — Cheri L Harrington

(57) ABSTRACT

A computing system may implement a basic input/output system (BIOS) update method. The BIOS also includes identifying an installed central processing unit (CPU) of a computer system coupled to a BIOS chipset, selecting CPU firmware corresponding to the installed CPU from a plurality of CPU platform firmware stored on a first memory, and loading the CPU firmware into a shared portion of a second memory coupled to the BIOS chipset, where the shared portion of the second memory is configured to store the CPU firmware as secondary CPU firmware.

20 Claims, 5 Drawing Sheets

(56) References Cited

U.S. PATENT DOCUMENTS

| | | | |
|---|---|---|---|
| 2013/0013905 A1* | 1/2013 | Held | G06F 21/572 713/2 |
| 2013/0125107 A1* | 5/2013 | Bandakka | H04L 67/10 717/171 |
| 2013/0185563 A1* | 7/2013 | Djabarov | H04L 67/34 717/173 |
| 2014/0040605 A1* | 2/2014 | Futral | G06F 21/572 713/2 |
| 2014/0082262 A1* | 3/2014 | Nachimuthu | G06F 12/0246 711/103 |
| 2014/0173328 A1* | 6/2014 | Dasari | G06F 11/0736 714/2 |
| 2015/0149815 A1* | 5/2015 | Maity | G06F 11/0706 714/5.11 |
| 2016/0055113 A1* | 2/2016 | Hodge | G06F 13/4022 710/308 |
| 2016/0188313 A1* | 6/2016 | Dubal | G06F 8/65 717/172 |
| 2016/0188345 A1* | 6/2016 | Chen | G06F 9/4403 713/2 |
| 2017/0322790 A1* | 11/2017 | Surdu | G06F 11/1479 |
| 2017/0357515 A1* | 12/2017 | Bower, III | G06F 9/4411 |
| 2018/0165157 A1* | 6/2018 | Olinsky | G06F 11/1433 |
| 2019/0213012 A1* | 7/2019 | Chen | G06F 9/4401 |
| 2020/0019397 A1* | 1/2020 | Duran | H04L 9/3247 |
| 2020/0201617 A1* | 6/2020 | Park | G06F 11/1458 |
| 2020/0272738 A1* | 8/2020 | Shroff | G06F 13/4282 |
| 2021/0117272 A1* | 4/2021 | Kleppinger | G06F 11/1461 |
| 2022/0137953 A1* | 5/2022 | Kawazu | G06F 8/65 717/168 |
| 2022/0147343 A1* | 5/2022 | Hsia | G06F 8/61 |

\* cited by examiner

COMBINATION BIOS WITH A/B RECOVERY

BACKGROUND

Basic Input/Output System (BIOS) is firmware used to perform hardware initialization during a computer system's boot process (power-on startup), such as hardware and software configuration and test activities. The BIOS in most computing devices initializes and tests the system hardware components and loads a boot loader from a mass memory device, which then initializes the operating system (OS). The BIOS firmware comes pre-installed on the computing system's motherboard and it is one of the first programs to run when powered on.

The BIOS and accompanying chipset support a particular computer system motherboard that includes a socket for a system on a chip (SOC) that supports one or more central processing unit (CPU)/processor families. Because the socket may support multiple SOCs on a particular motherboard, the BIOS firmware image, called a combo BIOS, often includes multiple SOC sections of code on its read only memory (ROM) to support a particular CPU family, and specifically the CPU present at boot time. Additionally, the combo BIOS firmware image may also support an A/B recovery scheme to comply with firmware anti-rollback industry standards. This means the BIOS ROM must also include a backup (identical B version) of certain portions of boot code, including the SOC sections of code in the event the primary (A version) fails during bootup or BIOS upgrade process (e.g., power failure or memory corruption).

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

Consumers that purchase computer systems have varying requirements dependent on use and budget. As such, CPUs are designed to meet various price points and performance metrics. For efficiency, a family of CPUs covering these price points is designed to fit into the same socket on the motherboard of the computer system, which provides flexibility and cost savings for manufacturers and end users to select a CPU based on an older or newer version, price, and performance without having to have a large stock of, or the purchase of, a new motherboard. However, the BIOS memory that holds the instructions or CPU firmware for operating various families of CPUs is limited due to die space and cost. The memory space is further reduced based on industry standards that require there be stored copies of the CPU family firmware and a recovery process in case of boot or BIOS update failure. This further limits the number of CPU platforms or families' firmware that may be stored on the BIOS memory.

Figure 1:
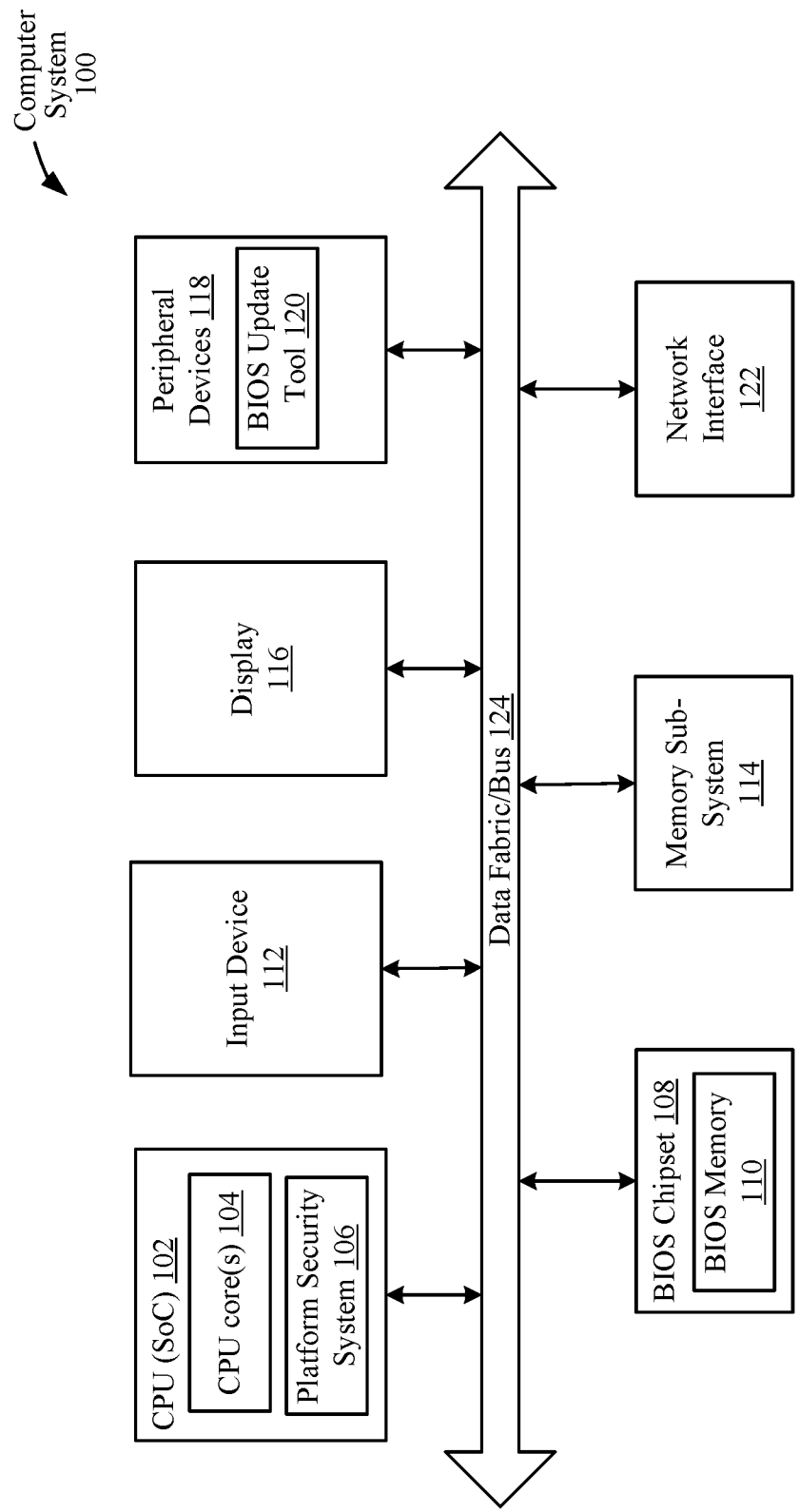
FIG. 1 is a block diagram of a computer system, according to one embodiment, that includes combination basis input-output system (BIOS) update and recovery system.

FIG. 1 is a block diagram of a computer system 100, according to one embodiment, that includes combination basic input-output system (BIOS) update and recovery system and firmware that utilizes a shared memory space and supports multiple CPU families. In one embodiment, the computer system 100 includes a central processing unit (CPU) system on a chip (SoC) 102 that includes CPU core(s) 104 and a platform security system 106, a BIOS chipset 108 that includes a BIOS memory 110, input device 112, display 116, memory subsystem 114, network interface 122, peripheral devices 118 and BIOS update tool 120, each connected to a data fabric/bus 124. In other embodiments, computer system 100 may include other components and/or be arranged in other configurations.

In one embodiment, each CPU SoC 102 includes various logic and systems, such as one or more CPU core(s) 104, a platform security system 106, a cache subsystem (not shown), a graphics processing unit (not shown). CPU SoC 102 is an example of many possible CPU SoCs that are configured to be inserted into a CPU socket in computer system 100 and initialized by the BIOS chipset 108 during a boot up process. In various embodiments, the platform security system 106 may include various components, such as a processor or microcontroller, a cryptographic coprocessor, random number generator, local memory, memory management unit, and various interfaces for communicating with other components outside the platform security system 106, such as the BIOS chipset 110 to initiate and manage the computer system 100 boot and initialization process.

The BIOS chipset 108 may include various logic structures (not shown) and memory structures, such as BIOS memory 110, for storing and communicating firmware associated in part with the CPU SoC (e.g., CPU SoC 102) to initialize and boot up computer system 100. In one embodiment, the BIOS memory 110 is configurable to include a shared portion that may include backup/secondary CPU firmware in the event of a computer system 100 boot failure or primary CPU firmware corruption. The BIOS memory 110 utilized by the BIOS chipset 108, for example, may be one or combination of dynamic random access memory (DRAM), static random access memory (SRAM), NAND flash memory, NOR flash memory, ferroelectric random access memory (FeRAM), or others.

The computer system 100 includes user interface devices for receiving information from or providing information to a user. Specifically, the computer system 100 includes an input device 112, such as a keyboard, mouse, touch-screen, or other device for receiving information from the user. The computer system 100 may display certain information to the user via a display 116, such as a monitor, light-emitting diode (LED) display, liquid crystal display, or other output device. Computer system 100 additionally includes a network interface 122 for transmitting and receiving data over a wired or wireless network, and one or more peripheral devices 118. The peripheral devices 118 may include external storage devices, such as mass storage devices, universal serial bus (USB) memory devices, and additionally location detection devices, sensors, input devices, or other types of devices that may be used by the computer system 100. In one embodiment, the peripheral devices 118 includes the BIOS update tool 120 that may be included as software or firmware on a storage device (e.g., USB device). In other embodiments, the BIOS update tool 120 may be included in another portion of computer system 100, for example, the memory subsystem 114 or communicatively coupled to the computer system 100 by another manner, such through network interface 122.

The computer system 100 may also include a memory subsystem 114 that may include memory devices used by one or more components of the computer system 100. For example, memory devices such as random-access memory (RAM) modules, dynamic random-access memory (DRAM) modules, read-only memory (ROM) modules, bit registers, hard disks, and other non-transitory computer-readable media. For convenience, herein the memory devices have been grouped into the memory subsystem 114, however, the memory devices, such as registers or ROMs for example, may be located throughout the computer system 100, and in some cases, external to the computer system 100, such as an external drive, USB drive, or other computer system.

In various embodiments, computer system 100 can be a server, desktop computer, laptop, mobile device, game console, streaming device, wearable device, or any of various other types of computing systems or devices. The number, orientation, and type of components illustrated in computer system 100 is by way of example only and can vary from embodiment to embodiment based on application and system architecture.

Figure 2:
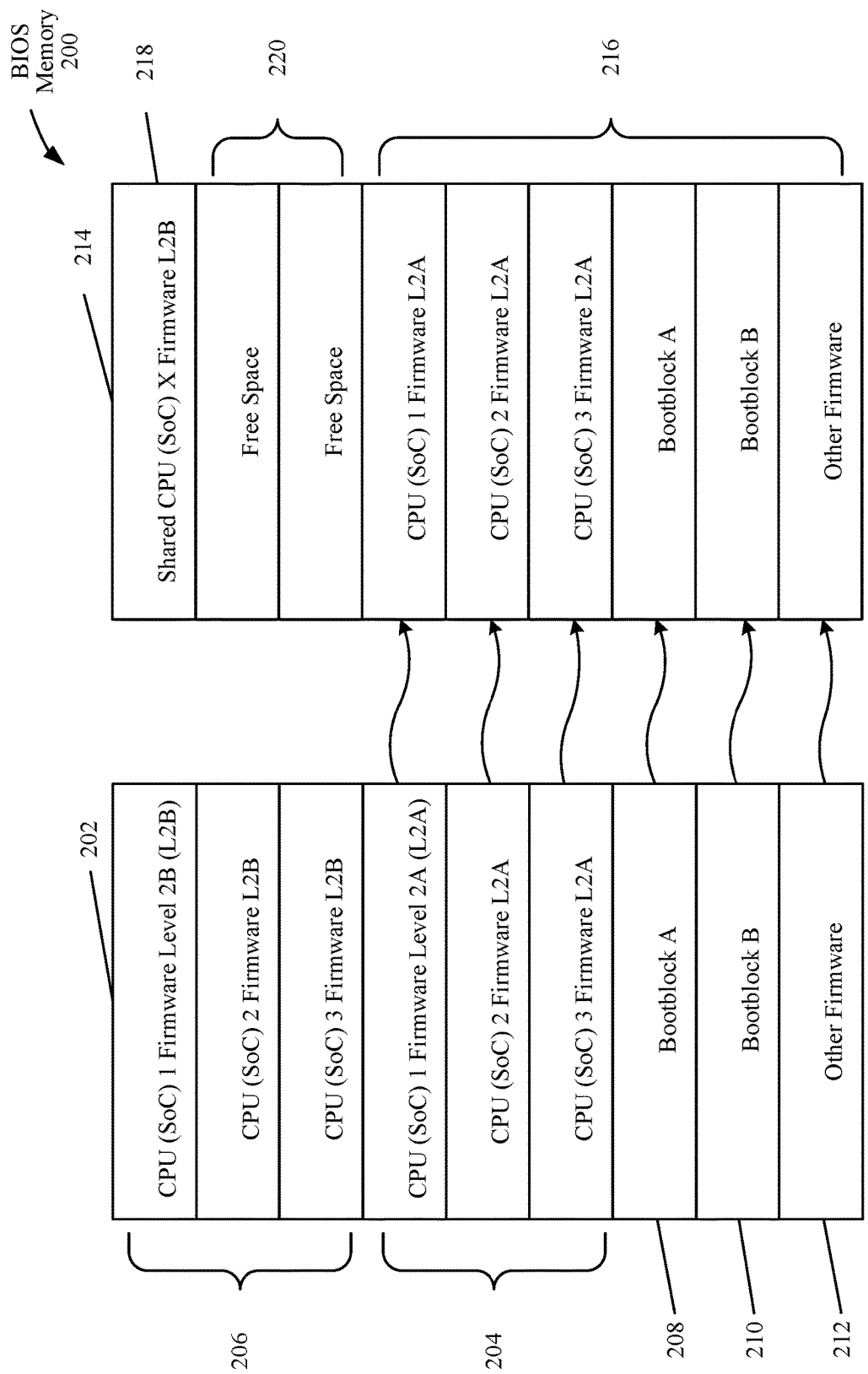
FIG. 2 illustrates an embodiment of a BIOS memory showing a comparison between the prior art configuration and an embodiment of a new configuration.

FIG. 2 illustrates an embodiment of a BIOS memory 200 (e.g., BIOS memory 110 of FIG. 1) showing a comparison between a first BIOS memory configuration 202 that stores A and B copies of multiple CPU SoC firmware versions and a second BIOS memory configuration 214 used in an embodiment that reduces the amount of space consumed while supporting A/B recovery. The arrows indicate blocks that are similarly located in both the first configuration 202 and the second configuration 214. The blocks include the A (designated as "Level 2A" or "L2A") and B ("Level 2B" or "L2B") copies of firmware versions for the different CPU families (e.g., CPU 1, CPU 2, and CPU 3 families). BIOS 202 includes three blocks of CPU SoC firmware versions as shown in CPU (SoC) firmware level 2A (CPU L2A) group 204, CPU (SoC) firmware level 2B (CPU L2B) group 206, bootblock A 208, and bootblock B 210. The BIOS will use a boot path that corresponds to the CPU installed in the computer system and bootblock A. For example, the installed CPU may be from the CPU family that corresponds to the CPU (SoC) 1 firmware level 2A (CPU 1 L2A) of CPU L2A group 204, so CPU 1 L2A along with bootblock A and other firmware 212 form the normal boot path for the computer system (e.g., computer system 100). However, in the event of a boot failure (e.g., power failure during BIOS update) or corruption in the CPU 1 L2A firmware, the BIOS system will use a secondary boot path that includes the CPU 1 processor firmware L2B (CPU 1 L2B), bootblock B 210, along with the other firmware 212 as the secondary boot path for the computer system. To comply with industry A/B recovery standards, the BIOS includes this secondary boot path by storing A and B copies of each CPU processor family's firmware, as can be seen with respect to the CPU L2A group 204 and the CPU L2B group 206.

Moving to the embodiment of BIOS memory configuration 214, the firmware group 216 includes a portion of the firmware blocks in BIOS 202, specifically, CPU L2A group 204, bootblock A 208, bootblock B 210, and the other firmware 212. However, BIOS 214 includes a shared CPU X Firmware L2B (shared CPU X L2B) 218 block that is configured to store a single backup CPU L2B corresponding to the CPU L2A firmware associated with the installed CPU in the computer system. The L2A firmware for the installed CPU is copied to the shared CPU X L2B 218 block as the L2B firmware so memory space that would otherwise be used for storing CPU 2 firmware L2B and CPU 3 firmware L2B can be freed. For example, if the installed CPU is from the CPU family that corresponds to the CPU 1 L2A firmware of firmware group 216, then that block would be copied and stored in the shared CPU X L2B 218, and then be included in the secondary boot path upon boot failure or primary firmware corruption. Likewise, if the installed or detected CPU is from the CPU 2 or CPU 3 family, then a copy of the CPU 2 L2A or CPU 3 L2A firmware is copied to the shared CPU X L2B block 218 as CPU 2 L2B or CPU 3 L2B, respectively.

Embodiments implementing the shared CPU X L2B block in the BIOS 214 can then take advantage of freed up blocks of memory, as shown in BIOS 214 as free space 220. In one embodiment, the free space 220 blocks can be utilized to hold additional processor families, for example, CPU 4 L2A and CPU 5 L2A (not shown), thus providing additional computer system design flexibility for computer system manufacturers and users.

Figure 3:
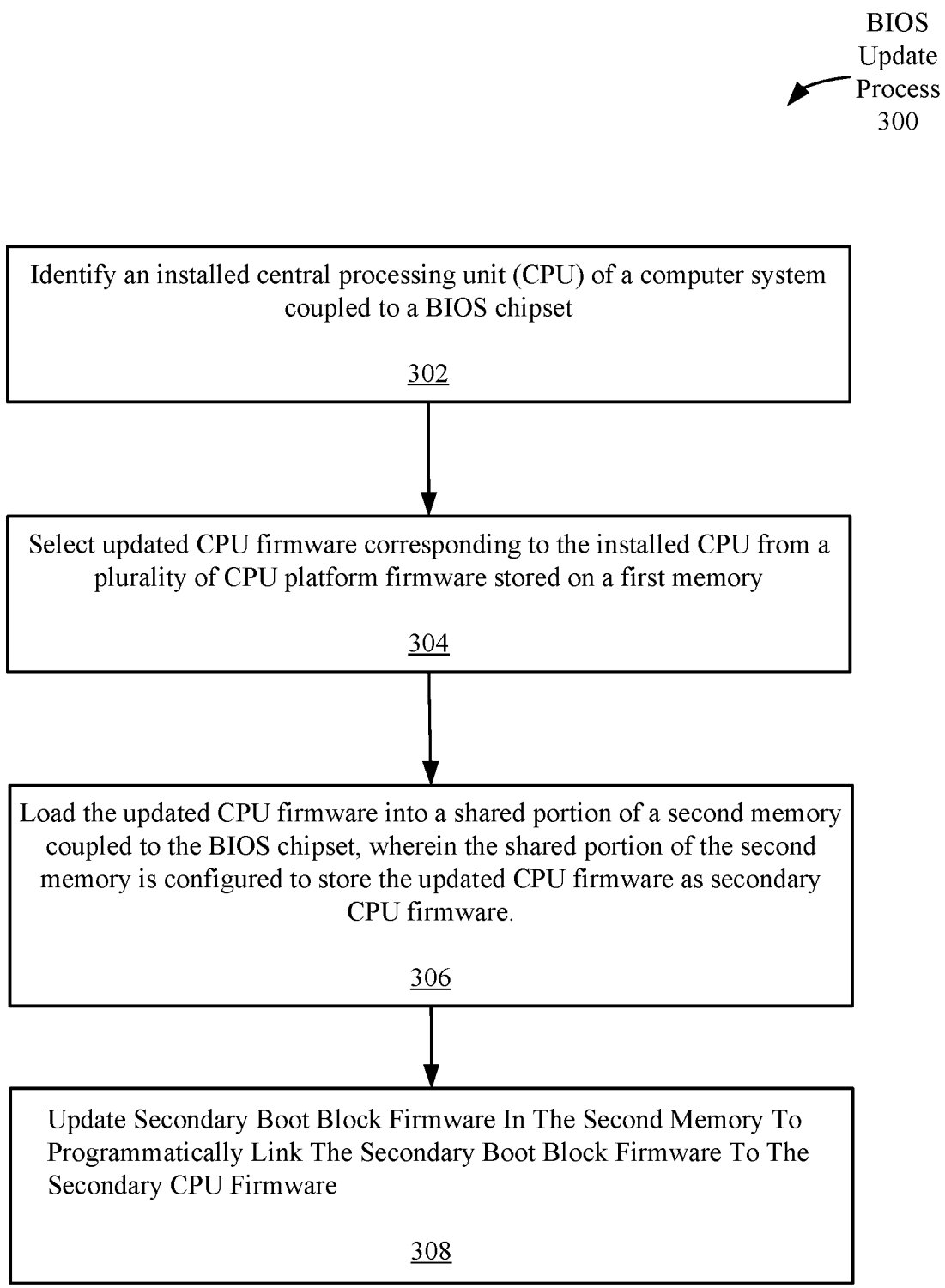
FIG. 3 illustrates an embodiment of a BIOS update process that may be executed by various components of a computer system.

FIG. 3 illustrates an embodiment of a BIOS update process 300 that may be executed by various components of computer system 100, specifically, CPU (SoC) 102, BIOS chipset 108, BIOS memory 110, BIOS update tool 120, and the data fabric/bus 124. In one embodiment, at block 302, the process begins by identifying, using a BIOS update tool, an installed CPU of a computer system coupled to a BIOS chipset, such as the BIOS update tool 120, CPU (SoC) 102 and computer system 100 of FIG. 1. At block 304, updated CPU firmware that corresponds to the installed CPU is selected from a plurality of CPU platform firmware stored on a first memory. In various embodiments, the first memory is a peripheral device (e.g., peripheral device 118 of FIG. 1), such as an external memory device (e.g., USB drive), and may also include the BIOS update tool (e.g., see FIG. 1). In another embodiment, the first memory is a primary portion of the BIOS memory (e.g., BIOS memory 110) that contains the primary CPU family firmware, such as CPU 1 L2A, CPU 2 L2A, and CPU 3 L2A of the firmware group 216 of FIG. 2.

At block 306, the updated CPU firmware is loaded into a shared portion of the second memory coupled to the BIOS chipset, wherein the shared portion of the second memory is configured to store the updated CPU firmware as secondary CPU firmware, such as shared CPU X L2B 218 of FIG. 2. In one embodiment, the second memory is the BIOS memory and the secondary CPU firmware is utilized as the backup CPU firmware in a recovery boot path after an upgrade or update failure, or corruption in the primary boot path. In one embodiment, at block 308, secondary boot block firmware may be updated in the second memory to programmatically link the secondary boot block firmware to the secondary CPU firmware. In one embodiment, to programmatically link the secondary boot block firmware to the secondary CPU firmware a pointer in the secondary boot block firmware is updated to reflect where the BIOS update tool may find the secondary CPU firmware in the shared memory. Additionally, according to one embodiment, a verification may be performed, such as the calculation of a checksum or other mechanism, to ensure the primary and secondary firmware are identical.

The BIOS firmware can be upgraded to reflect changes to the computer system, such as feature upgrades, change in CPU, or the upgrade is the initial BIOS firmware installation from the computer system manufacturer. The most common failure mode is power loss during this process. How the system responds depends on whether the failure occurred during the primary firmware (e.g., CPU 1 L2A of the firmware group 216 of FIG. 2) or the secondary (backup) firmware (e.g., CPU X L2B 218 of FIG. 2) update. In addition, the system's responds to the failure in a manner so that the backup boot path firmware is not older than the updated version, in compliance with firmware anti-rollback industry standards. As a result, according to one embodiment, in either failure mode, the BIOS update process starts with the update of the secondary firmware.

Figure 4:
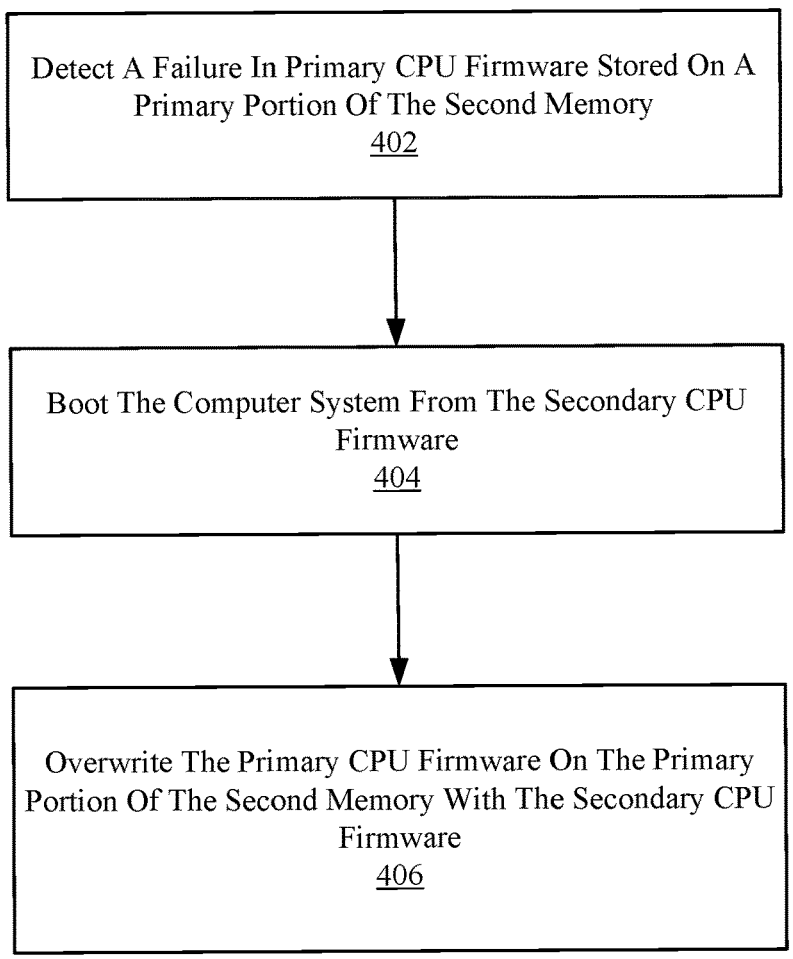
FIG. 4 illustrates an embodiment of a BIOS run-time self-healing process that may be executed by a computer system when the primary boot path fails.

FIG. 4 illustrates an embodiment of a BIOS run-time self-healing process 400 that may be executed by the computer system 100 when the primary boot path fails, and specifically, the primary CPU firmware is corrupted. The self-healing process 400 is performed following the process 300, using the BIOS as updated according to process 300. At block 402, in one embodiment, the computer system detects a failure in the primary CPU firmware stored on a primary portion of the second memory (e.g., CPU 1 L2A of the firmware group 216 of FIG. 2). The computer system, at block 404, then boots from the secondary CPU firmware through the boot block B path (e.g., CPU X L2B 218 and bootblock B of FIG. 2). At block 406, the computer system self-repairs by overwriting the primary CPU firmware on the primary portion of the second memory (e.g., BIOS memory 110 of FIG. 1) with the secondary CPU firmware. The system similarly copies boot block B to boot block A to self-heal when boot block A is corrupted.

Figure 5:
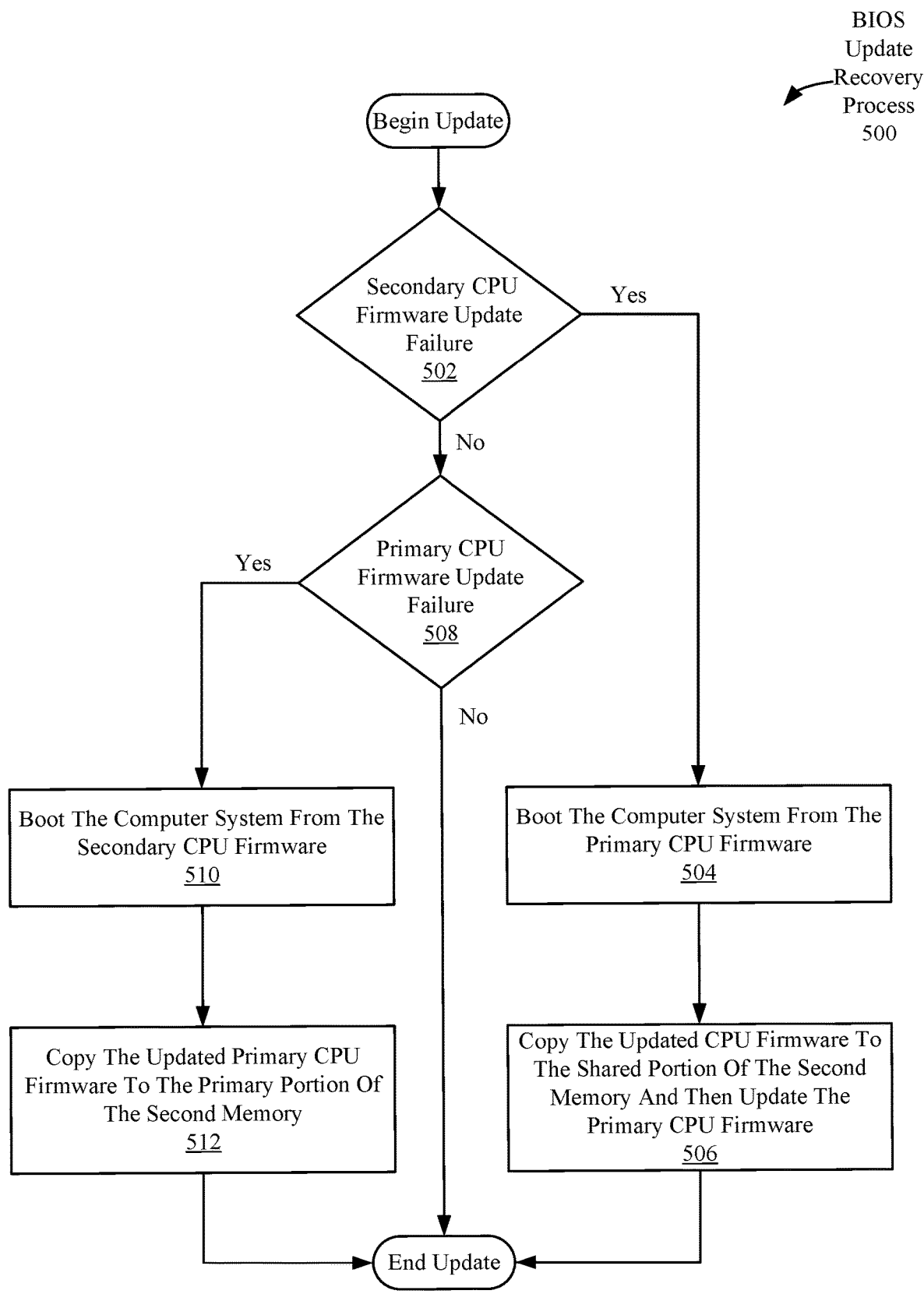
FIG. 5 illustrates an embodiment of a BIOS update recovery process that may be executed by the computer system.

FIG. 5 illustrates an embodiment of a BIOS update recovery process 500 that may be executed by the computer system 100 when the update of the primary or secondary CPU firmware fails (e.g., CPU 1 L2A of the firmware group 216 and CPU X L2B 218 of FIG. 2). The recovery process 500 is performed following the process 300, using the BIOS as updated according to process 300, and may be performed before or after the self-healing process 400. In one embodiment, to comply with anti-rollback industry standards providing that the secondary, or backup, firmware be current compared to the primary CPU firmware version, the process begins with the secondary CPU firmware update rather than the primary CPU firmware update. In another embodiment, the self-healing feature as discussed with respect to the BIOS run-time self-healing process 400 may be disabled to prevent a race condition where the computer system tried to update and self-heal at the same time.

The process 500 begins at decision block 502 where, if there is a secondary CPU firmware update failure, the process continues at block 504 and the computer system boots from the primary CPU firmware which has yet to be updated. At block 506, according to one embodiment, the update process continues and the BIOS update tool (e.g., BIOS update tool 120 of FIG. 1) copies the updated CPU firmware to the shared portion of the second memory and then updates the primary CPU firmware with the updated CPU firmware.

At block 502, if the secondary CPU firmware update does not fail, the process continues at decision block 508 with the primary CPU firmware update. If the primary CPU firmware update fails then the computer system, at block 510, boots the computer system from the secondary CPU firmware, which had been updated previously. At block 512, according to one embodiment, once the computer system boots from the secondary CPU the updating process may continue and copy the updated CPU firmware to overwrite the old primary CPU firmware that failed, as shown at decision block 508, and the update is complete.

In various embodiments, all or portions of the BIOS update process 300, the BIOS run-time self-healing process 400, and the BIOS update recovery process 500 may be performed by code in addition to or other than the BIOS update tool. For example, the processes may be executed in part by logic or executable code within at least one of the BIOS update tool, the BIOS chipset and the platform security system (e.g., BIOS chipset 108, BIOS update tool 120 and platform security system 106 of FIG. 1) or other components within the computer system 100.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a basic input/output system (BIOS) update method. The BIOS system also includes identifying an installed central processing unit (CPU) of a computer system coupled to a BIOS chipset, selecting CPU firmware corresponding to the installed CPU from a plurality of CPU platform firmware stored on a first memory, and loading the CPU firmware into a shared portion of a second memory coupled to the BIOS chipset, where the shared portion of the second memory is configured to store the CPU firmware as secondary CPU firmware. Other embodiments of this aspect include corresponding computer systems, apparatus, and computer programs recorded on one or more computer storage devices, each configured to perform the actions of the methods.

Implementations may include one or more of the following features. The BIOS update method may include updating secondary boot block firmware in the second memory to programmatically link the secondary boot block firmware to the secondary CPU firmware. The BIOS update method may include, detecting a failure in primary CPU firmware stored on a primary portion of the second memory, booting the computer system from the secondary CPU firmware, and overwriting the primary CPU firmware on the primary portion of the second memory with the secondary CPU firmware. The loading of the CPU firmware into the shared portion of the second memory further may include copying primary CPU firmware corresponding to the installed CPU from a primary portion of the second memory into the shared portion of the second memory, where the first memory is the primary portion of the second memory. The loading of the CPU firmware into the shared portion of the second memory may include, copying the CPU firmware corresponding to the installed CPU from the first memory into the shared portion of the second memory, where the first memory is an external memory device communicatively coupled to the BIOS chipset, and copying the primary CPU firmware stored on a primary portion of the second memory with the CPU firmware from the external memory device. The BIOS update method may include copying at least one of other updated CPU family firmware, updated primary boot block firmware, and driver execution environment firmware from the first memory into the primary portion of the second memory. The BIOS update method may include, detecting a failure during the copying of the CPU firmware to the shared portion of the second memory, booting the computer system from the primary CPU firmware prior to the copying of the primary CPU firmware, and copying of the CPU firmware to the shared portion of the second memory. The BIOS update method may include, detecting a failure during the overwriting the primary CPU firmware stored on a primary portion of the second memory, booting the computer system from the secondary CPU firmware prior to the overwriting of the primary CPU firmware, and copying of the CPU firmware and the overwriting of the primary CPU firmware. Implementations of the described techniques may include hardware, a method or process, or computer software on a computer-accessible medium.

One general aspect includes a system including a BIOS update tool communicatively coupled to a BIOS chipset and configured to, identify an installed central processing unit (CPU) of a computer system coupled to the BIOS chipset, select CPU firmware corresponding to the installed CPU from a plurality of CPU firmware stored on a first memory, and load the CPU firmware into a shared portion of a second memory coupled to the BIOS chipset, where the shared portion of the second memory is configured to store the CPU firmware as secondary CPU firmware. Other embodiments of this aspect include corresponding computer systems, apparatus, and computer programs recorded on one or more computer storage devices, each configured to perform the actions of the methods.

Implementations may include one or more of the following features. The BIOS update tool may update secondary boot block firmware in the second memory to programmatically link the secondary boot block firmware to the secondary CPU firmware. The BIOS chipset may detect a failure in primary CPU firmware stored on a primary portion of the second memory, boot the computer system from the secondary CPU firmware, and overwrite the primary CPU firmware on the primary portion of the second memory with the secondary CPU firmware. The BIOS update tool may load the CPU firmware into the shared portion of the second memory by copying primary CPU firmware corresponding to the installed CPU from a primary portion of the second memory into the shared portion of the second memory, where the first memory is the primary portion of the second memory. The BIOS update tool may load the CPU firmware into the shared portion of the second memory by copying the CPU firmware corresponding to the installed CPU from the first memory into the shared portion of the second memory, where the first memory is an external memory device communicatively coupled to the BIOS chipset, and copy the primary CPU firmware stored on a primary portion of the second memory with the CPU firmware from the external memory device.

The BIOS update tool may copy at least one of other updated CPU family firmware, updated primary boot block firmware, and driver execution environment firmware from the first memory into the primary portion of the second memory. The BIOS update tool may detect a failure during the copying of the CPU firmware to the shared portion of the second memory, boot the computer system from the primary CPU firmware prior to copying the primary CPU firmware, and repeat the copying of the CPU firmware to the shared portion of the second memory. The BIOS update tool may detect a failure during the overwriting the primary CPU firmware stored on a primary portion of the second memory, boot the computer system from the secondary CPU firmware prior to overwriting the primary CPU firmware, and repeat the copying of the CPU firmware and the overwriting of the primary CPU firmware. Implementations of the described techniques may include hardware, a method or process, or computer software on a computer-accessible medium.

One general aspect includes a non-transitory computer readable storage medium storing one or more programs. The non-transitory computer readable storage medium also includes identifying an installed central processing unit (CPU) of a computer system coupled to a BIOS chipset, selecting CPU firmware corresponding to the installed CPU from a plurality of CPU platform firmware stored on a first memory, and loading the CPU firmware into a shared portion of a second memory coupled to the BIOS chipset, where the shared portion of the second memory is configured to store the CPU firmware as secondary CPU firmware. Other embodiments of this aspect include corresponding computer systems, apparatus, and computer programs recorded on one or more computer storage devices, each configured to perform the actions of the methods.

Implementations may include one or more of the following features. The computer-readable medium may include updating secondary boot block firmware in the second memory to programmatically link the secondary boot block firmware to the secondary CPU firmware. The computer-readable medium may include, detecting a failure in primary CPU firmware stored on a primary portion of the second memory, booting the computer system from the secondary CPU firmware, and overwriting the primary CPU firmware on the primary portion of the second memory with the secondary CPU firmware. The loading of the CPU firmware into the shared portion of the second memory further may include copying primary CPU firmware corresponding to the installed CPU from a primary portion of the second memory into the shared portion of the second memory, where the first memory is the primary portion of the second memory. Implementations of the described techniques may include hardware, a method or process, or computer software on a computer-accessible medium.

The embodiments described herein may include various operations and processes. These may be performed by hardware components, software, firmware, or a combination thereof. As used herein, the term "coupled to" may mean coupled directly or indirectly through one or more intervening components. Any of the signals provided over various lines and buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computer system 100 and/or portions thereof carried on the computer-readable storage medium may be a database or other data structure which can be read by a program and used, directly or indirectly, to fabricate the hardware comprising the computer system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the computer system 100. The netlist may then be placed and routed to produce a data set describing geometric shapes to be applied to masks. The masks may then be used in various semiconductor fabrication steps to produce a semiconductor circuit or circuits corresponding to the computer system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A basic input/output system (BIOS) update method, the method comprising:
   selecting a primary central processing unit (CPU) platform firmware associated with a first CPU family of an installed CPU from a plurality of primary CPU platform firmware stored on a first memory coupled to a BIOS chipset, wherein:
      each primary CPU platform firmware of the plurality of primary CPU platform firmware stored in the first memory is used in a primary boot path for a corresponding CPU family of a plurality of CPU families; and
   loading the selected primary CPU platform firmware into a shared portion of a second memory coupled to the BIOS chipset such that the shared portion of the second memory stores backup CPU platform firmware that includes the selected primary CPU platform firmware to be used in a secondary boot path for the first CPU family and omits one or more other primary CPU platform firmware of the plurality of primary CPU platform firmware, wherein the shared portion of the second memory includes a second primary CPU platform firmware used in a primary boot path of a CPU family different from each primary CPU platform firmware of the plurality of primary CPU platform firmware.

2. The BIOS update method of claim 1, further comprising updating a backup boot block firmware in the second memory to programmatically link the backup boot block firmware to the backup CPU platform firmware.

3. The BIOS update method of claim 1, further comprising:
   detecting a failure in the selected primary CPU platform firmware stored on a primary portion of the second memory;
   booting a computer system from the backup CPU platform firmware; and
   overwriting the primary CPU platform firmware on the primary portion of the second memory with the backup CPU platform firmware.

4. The BIOS update method of claim 1, wherein the loading of the selected primary CPU platform firmware into the shared portion of the second memory further comprises copying the selected primary CPU platform firmware corresponding to the installed CPU from a primary portion of the second memory into the shared portion of the second memory, wherein the first memory is the primary portion of the second memory.

5. The BIOS update method of claim 1, wherein the loading of the selected primary CPU platform firmware into the shared portion of the second memory further comprises:
   copying the selected primary CPU firmware corresponding to the installed CPU from the first memory into the shared portion of the second memory, wherein the first memory is an external memory device communicatively coupled to the BIOS chipset; and
   overwriting a second primary CPU platform firmware stored on a primary portion of the second memory with the selected primary CPU platform firmware from the external memory device.

6. The BIOS update method of claim 1, wherein the selected CPU platform firmware is a sole backup CPU platform firmware in the shared portion of the second memory.

7. The BIOS update method of claim 5, further comprising:
   detecting a failure during the copying of the selected primary CPU platform firmware to the shared portion of the second memory;
   booting a computer system from the second primary CPU firmware prior to the copying of the selected primary CPU firmware; and
   copying the second primary CPU firmware to the shared portion of the second memory.

8. The BIOS update method of claim 5, further comprising:
   detecting a failure during the copying of the selected primary CPU platform firmware stored on a primary portion of the second memory;
   booting a computer system from the backup CPU platform firmware prior to the copying of the selected primary CPU platform firmware; and copying the backup CPU platform firmware to overwrite the second primary CPU platform firmware.

9. A system, comprising:
a basic input/output system (BIOS) update tool communicatively coupled to a BIOS chipset and configured to:
select a primary central processing unit (CPU) platform firmware associated with a first CPU family of an installed CPU from a plurality of primary CPU platform firmware stored on a first memory, wherein each primary CPU platform firmware of the plurality of primary CPU platform firmware stored in the first memory is used in a primary boot path for a corresponding CPU family of a plurality of CPU families; and
load the selected primary CPU platform firmware into a shared portion of a second memory coupled to the BIOS chipset such that the shared portion of the second memory stores backup CPU platform firmware that includes the selected primary CPU platform firmware to be used in a secondary boot path for the first CPU family and omits one or more other primary CPU platform firmware of the plurality of primary CPU platform firmware, wherein the shared portion of the second memory includes a second primary CPU platform firmware used in a primary boot path of a CPU family different from each primary CPU platform firmware of the plurality of primary CPU platform firmware.

10. The system of claim 9, wherein the BIOS update tool is further configured to update a backup boot block firmware in the second memory to programmatically link the backup boot block firmware to the backup CPU firmware.

11. The system of claim 9, wherein the BIOS chipset is configured to:
detect a failure in the selected primary CPU platform firmware stored on a primary portion of the second memory;
boot the computer system from the backup CPU platform firmware; and
overwrite the selected primary CPU platform firmware on the primary portion of the second memory with the backup CPU platform firmware.

12. The system of claim 9, wherein:
the BIOS update tool is further configured to load the selected primary CPU platform firmware into the shared portion of the second memory by copying the selected primary CPU platform firmware corresponding to the installed CPU from a primary portion of the second memory into the shared portion of the second memory, and
the first memory is the primary portion of the second memory.

13. The system of claim 9, wherein the BIOS update tool is further configured to load the selected CPU platform firmware into the shared portion of the second memory by:
copying the selected primary CPU platform firmware corresponding to the installed CPU from the first memory into the shared portion of the second memory, wherein the first memory is an external memory device communicatively coupled to the BIOS chipset; and
overwriting a second primary CPU platform firmware stored on a primary portion of the second memory with the selected primary CPU platform firmware from the external memory device.

14. The system of claim 9, wherein the selected primary CPU platform firmware is a sole backup CPU platform firmware in the shared portion of the second memory.

15. The system of claim 13, wherein the BIOS update tool is further configured to:
detect a failure during copying of the selected primary CPU platform firmware to the shared portion of the second memory;
boot the computer system from the second primary CPU platform firmware prior to the copying of the selected primary CPU platform firmware; and
repeat the copying of the selected primary CPU platform firmware to the shared portion of the second memory.

16. The system of claim 13, wherein the BIOS update tool is further configured to:
detect a failure during the overwriting of the second primary CPU platform firmware stored on a primary portion of the second memory;
boot the computer system from the backup CPU platform firmware prior to overwriting the second primary CPU platform firmware; and
repeat the copying of the selected primary CPU platform firmware and the overwriting of the second primary CPU platform firmware.

17. A non-transitory computer-readable storage medium storing instructions, which, when executed by a computing device, cause the computing device to:
select a primary central processing unit (CPU) platform firmware associated with a CPU family of an installed CPU from a plurality of primary CPU platform firmware stored on a first memory coupled to a BIOS chipset, wherein each primary CPU platform firmware of the plurality of primary CPU platform firmware stored in the first memory is used in a primary boot path for a corresponding CPU family of a plurality of CPU families; and
load the selected primary CPU platform firmware into a shared portion of a second memory coupled to the BIOS chipset such that the shared portion of the second memory stores backup CPU platform firmware that includes the selected primary CPU platform firmware to be used in a secondary boot path for the CPU family and omits one or more other primary CPU platform firmware of the plurality of primary CPU platform, wherein the shared portion of the second memory includes a second primary CPU platform firmware used in a primary boot path of a CPU family different from each primary CPU platform firmware of the plurality of primary CPU platform firmware.

18. The non-transitory computer-readable storage medium of claim 17, further including instructions that cause the computing device to: update a backup boot block firmware in the second memory to programmatically link the backup boot block firmware to the backup CPU platform firmware.

19. The non-transitory computer-readable storage medium of claim 17, further including instructions that cause the computing device to:
detect a failure in a second primary CPU platform firmware stored on a primary portion of the second memory;
boot the computer system from the backup CPU platform firmware; and
overwrite the second primary CPU platform firmware on the primary portion of the second memory with the backup CPU platform firmware.

20. The non-transitory computer-readable storage medium of claim 17, wherein the loading of the selected primary CPU platform firmware into the shared portion of the second memory further comprises copying the selected primary CPU platform firmware corresponding to the installed CPU from a primary portion of the second memory into the shared portion of the second memory, wherein the first memory is the primary portion of the second memory.

* * * * *